(12) United States Patent
Ding et al.

(10) Patent No.: US 9,872,175 B2
(45) Date of Patent: Jan. 16, 2018

(54) PACKET PROCESSING METHOD, APPARATUS, AND SYSTEM

(71) Applicant: HUAWEI DEVICE (DONGGUAN) CO., LTD., Dongguan (CN)

(72) Inventors: Zhiming Ding, Shenzhen (CN); Guiming Shu, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 247 days.

(21) Appl. No.: 14/734,812

(22) Filed: Jun. 9, 2015

(65) Prior Publication Data

US 2015/0271672 A1    Sep. 24, 2015

Related U.S. Application Data

(63) Continuation of application No. PCT/CN2013/088947, filed on Dec. 10, 2013.

(30) Foreign Application Priority Data

Dec. 10, 2012  (CN) .......................... 2012 1 0528207

(51) Int. Cl.
*H04W 12/06*  (2009.01)
*H04W 12/02*  (2009.01)
*H04L 29/06*  (2006.01)

(52) U.S. Cl.
CPC ......... *H04W 12/06* (2013.01); *H04L 63/0464* (2013.01); *H04W 12/02* (2013.01); *H04L 63/162* (2013.01)

(58) Field of Classification Search
None
See application file for complete search history.

(56) References Cited

U.S. PATENT DOCUMENTS

2002/0007414 A1* 1/2002 Inoue .................... H04W 88/02
                                                              709/230
2008/0273700 A1* 11/2008 Wentink ................ H04L 1/1867
                                                              380/270

(Continued)

FOREIGN PATENT DOCUMENTS

CN   102143164 A    8/2011
CN   102647355 A    8/2012
WO   2011090257 A1  7/2011

OTHER PUBLICATIONS

Algredo-Badillo, I., et al., "Efficient hardware architecture for the AES-CCM protocol of the IEEE 802.11i standard," Computers and Electrical Engineering, vol. 36, Jan. 21, 2010, pp. 565-577.

(Continued)

*Primary Examiner* — William Goodchild
(74) *Attorney, Agent, or Firm* — Conley Rose, P.C.

(57) ABSTRACT

A packet processing method, apparatus, and system. A first node receives a first packet sent by a relay device, where the first packet includes data in a second packet sent by a second node to the relay device, the data in the second packet is encrypted by using second additional authentication data and a session key between the first node and the second node, and the second additional authentication data is generated by the second node according to at least address information in a packet header of the second packet by using a second rule; the first node generates first additional authentication data according to address information in a packet header of the first packet by using a first rule, and decrypts the data in the first packet by using the first additional authentication data and the session key.

20 Claims, 7 Drawing Sheets

(56) References Cited

U.S. PATENT DOCUMENTS

| | | | | |
|---|---|---|---|---|
| 2009/0271626 A1* | 10/2009 | Wang | ................... | H04W 12/06 |
| | | | | 713/170 |
| 2011/0026505 A1* | 2/2011 | Trainin | ................ | H04L 1/1621 |
| | | | | 370/338 |
| 2012/0191978 A1* | 7/2012 | Little | ................... | H04L 51/066 |
| | | | | 713/176 |
| 2013/0010961 A1* | 1/2013 | Morimoto | ........... | H04W 76/022 |
| | | | | 380/270 |
| 2015/0003464 A1* | 1/2015 | Zhang | .................. | H04L 41/083 |
| | | | | 370/400 |

OTHER PUBLICATIONS

Foreign Communication From a Counterpart Application, European Application No. 13863218.7, European Office Action dated Apr. 5, 2016, 7 pages.

"Relays for 802.11ah," IEEE 802.11-12/1323r0, Nov. 2012, 14 pages.

Foreign Communication From a Counterpart Application, European Application No. 13863218.7, Extended European Search Report dated Nov. 3, 2015, 6 pages.

Foreign Communication From a Counterpart Application, PCT Application No. PCT/CN2013/088947, International Search Report dated Mar. 13, 2014, 2 pages.

Foreign Communication From a Counterpart Application, PCT Application No. PCT/CN2013/088947, Written Opinion dated Mar. 13, 2014, 7 pages.

\* cited by examiner

| Frame control | A1 | A2 | A3 | Sequence control | A4 | Quality of service control |

A first node receives a first packet sent by a relay device, where the first packet includes data in a second packet sent by a second node to the relay device; the data in the second packet is encrypted by using second additional authentication data and a session key between the first node and the second node; the second additional authentication data is generated by the second node at least according to address information in a packet header of the second packet by using a second rule; the address information in the packet header of the second packet indicates that a receiving party of the second packet is the relay device, a sending party is the second node, and a next receiving party is the first node ⟶ 301

The first node generates first additional authentication data at least according to address information in a packet header of the first packet by using a first rule, where the address information included in the packet header of the first packet indicates that a receiving party of the first packet is the first node, a sending party is the relay device, and a previous sending party is the second node, and the first additional authentication data is the same as the second additional authentication data ⟶ 302

The first node decrypts the data in the first packet by using the first additional authentication data and the session key between the first node and the second node ⟶ 303

FIG. 3

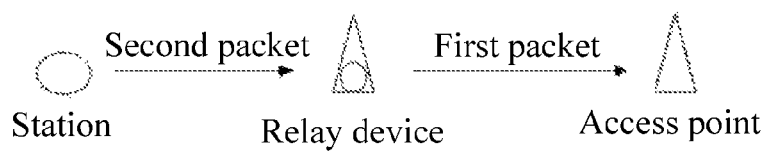

Station    Relay device    Access point

FIG. 4

601 — A relay device receives a second packet sent by a second node, where address information in a packet header of the second packet indicates that a receiving party of the second packet is the relay device, a sending party is the second node, and a next receiving party is a first node; data in the second packet is encrypted by using second additional authentication data and a session key between the first node and the second node; the second additional authentication data is generated by the second node at least according to the address information in the packet header of the second packet by using a second rule 602 — The relay device sends a first packet to the first node, where the first packet includes the data in the second packet, and address information included in a packet header of the first packet indicates that a receiving party of the first packet is the first node, a sending party is the relay device, and a previous sending party is the second node, so that the first node generates first additional authentication data at least according to the address information in the packet header of the first packet by using a first rule, and decrypts the data in the first packet by using the first additional authentication data and the session key between the first node and the second node, where the first additional authentication data is the same as the second additional authentication data

FIG. 6

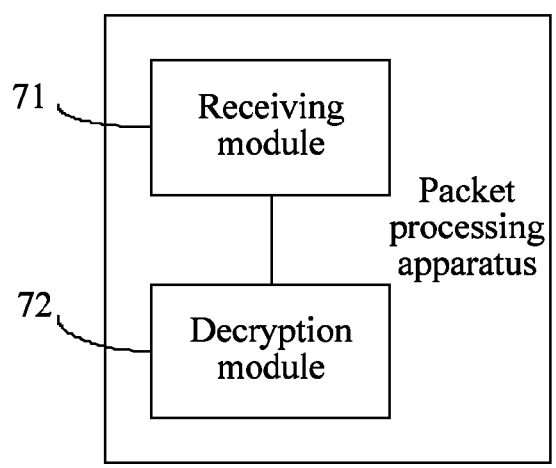

FIG. 7

PACKET PROCESSING METHOD, APPARATUS, AND SYSTEM

CROSS-REFERENCE TO RELATED APPLICATIONS

This application is a continuation of International Application No. PCT/CN2013/088947, filed on Dec. 10, 2013, which claims priority to Chinese Patent Application No. 201210528207.7, filed on Dec. 10, 2012, both of which are hereby incorporated by reference in their entireties.

TECHNICAL FIELD

Embodiments of the present invention relate to the field of communications technologies, and in particular, to a packet processing method, apparatus, and system.

BACKGROUND

In the Institute of Electrical and Electronics Engineers (IEEE) 802.11 ah standard, to extend a coverage area of an Access Point (AP), a relay device (Relay) is usually added between a Station (STA) and the AP, and an encrypted packet is forwarded between the STA and the AP by using the Relay. According to a standard implementation, a session key PTKrd is negotiated between the Relay and the STA, where Pairwise Transient Key (PTK) is a transient key between nodes, r represents the Relay, and d represents a downlink of the Relay. A session key PTKru is also negotiated between the Relay and the AP, where r represents the Relay, and u represents an uplink of the Relay. Generally, when the Relay forwards an encrypted uplink packet sent to the AP by the STA, the Relay first decrypts the encrypted uplink packet by using the PTKrd, and then encrypts the encrypted uplink packet by using the PTKru; when the Relay forwards an encrypted downlink packet sent to the STA by the AP, the Relay first decrypts the encrypted downlink packet by using the PTKru, and then encrypts the encrypted downlink packet by using the PTKrd.

The foregoing processing process in which the Relay needs to perform decryption and then perform encryption when forwarding an encrypted packet between the STA and the AP needs to occupy some processing time, which reduces channel utilization and increases additional power consumption of the Relay.

SUMMARY

The present invention provides a packet processing method, apparatus, and system, which are used to solve an existing problem that a processing process in which a relay device needs to perform decryption and then perform encryption when forwarding a packet between a station and an access point results in reduced channel utilization.

According to a first aspect, the present invention provides a packet processing method, applied to a scenario in which a relay device forwards a packet between a first node and a second node, including receiving, by the first node, a first packet sent by the relay device, where the first packet includes data in a second packet sent by the second node to the relay device, the data in the second packet is encrypted by using second additional authentication data and a session key between the first node and the second node, the second additional authentication data is generated by the second node according to at least address information in a packet header of the second packet by using a second rule, and the address information in the packet header of the second packet indicates that a receiving party of the second packet is the relay device, a sending party is the second node, and a next receiving party is the first node, generating, by the first node, first additional authentication data according to at least address information in a packet header of the first packet by using a first rule, where the address information included in the packet header of the first packet indicates that a receiving party of the first packet is the first node, a sending party is the relay device, and a previous sending party is the second node, and the first additional authentication data is the same as the second additional authentication data, and decrypting, by the first node, data in the first packet by using the first additional authentication data and the session key between the first node and the second node.

Based on the first aspect, in a first implementation manner, the first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Based on the first aspect or the first implementation manner of the first aspect, in a second implementation manner, the sequence of the addresses in the second additional authentication data is the same as the sequence of the addresses in the first additional authentication data.

Based on the first aspect, or the first or second implementation manner of the first aspect, in a third implementation manner, the second packet further includes relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

Based on the first aspect, or the first, second, or third implementation manner of the first aspect, in a fourth implementation manner, the first node is a station, and the second node is an access point; or the first node is an access point, and the second node is a station.

According to a second aspect, the present invention provides a packet processing method, applied to a scenario in which a relay device forwards a packet between a first node and a second node, including generating, by the second node, a second packet, where address information in a packet header of the second packet indicates that a receiving party of the second packet is the relay device, a sending party is the second node, and a next receiving party is the first node, generating, by the second node, second additional authentication data according to at least the address information in the packet header of the second packet by using a second rule, and encrypting data in the second packet by using the second additional authentication data and a session key between the first node and the second node, and sending, by the second node, the encrypted second packet to the relay device, so that after receiving the second packet, the relay device sends a first packet to the first node, where the first packet includes the data in the second packet, and address information included in a packet header of the first packet indicates that a receiving party of the first packet is the first node, a sending party is the relay device, and a previous sending party is the second node; after receiving the first packet, the first node generates first additional authentication data according to at least the address information in the packet header of the first packet by using a first rule, and decrypts data in the first packet by using the first additional authentication data and the session key between the first node and the second node, where the first additional authentication data is the same as the second additional authentication data.

Based on the second aspect, in a first implementation manner, the first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Based on the second aspect or the first implementation manner of the second aspect, in a second implementation manner, the sequence of the addresses in the second additional authentication data is the same as the sequence of the addresses in the first additional authentication data.

Based on the second aspect, or the first or second implementation manner of the second aspect, in a third implementation manner, the second packet further includes relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

Based on the second aspect, or the first, second, or third implementation manner of the second aspect, in a fourth implementation manner, the first node is a station, and the second node is an access point; or the first node is an access point, and the second node is a station.

According to a third aspect, the present invention provides a packet processing method, applied to a scenario in which a relay device forwards a packet between a first node and a second node, including receiving, by the relay device, a second packet sent by the second node, where address information in a packet header of the second packet indicates that a receiving party of the second packet is the relay device, a sending party is the second node, and a next receiving party is the first node; data in the second packet is encrypted by using second additional authentication data and a session key between the first node and the second node; the second additional authentication data is generated by the second node according to at least the address information in the packet header of the second packet by using a second rule, and sending, by the relay device, a first packet to the first node, where the first packet includes the data in the second packet, and address information included in a packet header of the first packet indicates that a receiving party of the first packet is the first node, a sending party is the relay device, and a previous sending party is the second node, so that the first node generates first additional authentication data according to at least the address information in the packet header of the first packet by using a first rule, and decrypts data in the first packet by using the first additional authentication data and the session key between the first node and the second node, where the first additional authentication data is the same as the second additional authentication data.

Based on the third aspect, in a first implementation manner, the first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Based on the third aspect or the first implementation manner of the third aspect, in a second implementation manner, the sequence of the addresses in the second additional authentication data is the same as the sequence of the addresses in the first additional authentication data.

Based on the third aspect, or the first or second implementation manner of the third aspect, in a third implementation manner, the second packet further includes relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

Based on the third aspect, or the first, second, or third implementation manner of the third aspect, in a fourth implementation manner, the first node is a station, and the second node is an access point; or the first node is an access point, and the second node is a station.

According to a fourth aspect, the present invention provides a packet processing apparatus, located on a side of a first node, applied to a scenario in which a relay device forwards a packet between the first node and a second node, including a receiving module configured to receive a first packet sent by the relay device, where the first packet includes data in a second packet sent by the second node to the relay device, the data in the second packet is encrypted by using second additional authentication data and a session key between the first node and the second node, the second additional authentication data is generated by the second node according to at least address information in a packet header of the second packet by using a second rule, and the address information in the packet header of the second packet indicates that a receiving party of the second packet is the relay device, a sending party is the second node, and a next receiving party is the first node, and a decryption module configured to generate first additional authentication data according to at least address information in a packet header of the first packet by using a first rule, where the address information included in the packet header of the first packet indicates that a receiving party of the first packet is the first node, a sending party is the relay device, and a previous sending party is the second node, and the additional authentication data generated by using the first rule is the same as the additional authentication data generated by using the second rule; and decrypt data in the first packet by using the first additional authentication data and the session key between the first node and the second node, where the first additional authentication data is the same as the second additional authentication data.

Based on the fourth aspect, in a first implementation manner, the first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Based on the fourth aspect or the first implementation manner of the fourth aspect, in a second implementation manner, the sequence of the addresses in the second additional authentication data is the same as the sequence of the addresses in the first additional authentication data.

Based on the fourth aspect, or the first or second implementation manner of the fourth aspect, in a third implementation manner, the second packet further includes relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

Based on the fourth aspect, or the first, second, or third implementation manner of the fourth aspect, in a fourth implementation manner, the first node is a station, and the second node is an access point; or the first node is an access point, and the second node is a station.

According to a fifth aspect, the present invention provides a packet processing apparatus, located on a side of a second node, applied to a scenario in which a relay device forwards a packet between the second node and a first node, including a packet generation module configured to generate a second packet, where address information in a packet header of the second packet indicates that a receiving party of the second packet is the relay device, a sending party is the second node, and a next receiving party is the first node, an encryption module configured to generate second additional authentication data according to at least the address information in the packet header of the second packet by using a second rule, and encrypt data in the second packet by using the second additional authentication data and a session key between the first node and the second node, and a sending module configured to send the encrypted second packet to the relay device, so that after receiving the second packet, the relay device sends a first packet to the first node, where the first packet includes the data in the second packet, and address information included in the packet header of the first packet indicates that a receiving party of the first packet is the first node, a sending party is the relay device, and a previous sending party is the second node; after receiving the first packet, the first node generates first additional authentication data according to at least the address information in the packet header of the first packet by using a first rule, and decrypts data in the first packet by using the first additional authentication data and the session key between the first node and the second node, where the first additional authentication data is the same as the second additional authentication data.

Based on the fifth aspect, in a first implementation manner, the first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Based on the fifth aspect or the first implementation manner of the fifth aspect, in a second implementation manner, the sequence of the addresses in the second additional authentication data is the same as the sequence of the addresses in the first additional authentication data.

Based on the fifth aspect, or the first or second implementation manner of the fifth aspect, in a third implementation manner, the second packet further includes relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

Based on the fifth aspect, or the first, second, or third implementation manner of the fifth aspect, in a fourth implementation manner, the second node is a station, and the first node is an access point; or the second node is an access point, and the first node is a station.

According to a sixth aspect, the present invention provides a packet processing apparatus, located on a side of a relay device, applied to a scenario in which the relay device forwards a packet between a first node and a second node, including a receiving module configured to receive a second packet sent by the second node, where address information in a packet header of the second packet indicates that a receiving party of the second packet is the relay device, a sending party is the second node, and a next receiving party is the first node; data in the second packet is encrypted by using second additional authentication data and a session key between the first node and the second node; the second additional authentication data is generated by the second node according to at least the address information in the packet header of the second packet by using a second rule, and a sending module configured to send a first packet to the first node, where the first packet includes the data in the second packet, and address information included in a packet header of the first packet indicates that a receiving party of the first packet is the first node, a sending party is the relay device, and a previous sending party is the second node, so that the first node generates first additional authentication data according to at least the address information in the packet header of the first packet by using a first rule, and decrypts data in the first packet by using the first additional authentication data and the session key between the first node and the second node, where the first additional authentication data is the same as the second additional authentication data.

Based on the sixth aspect, in a first implementation manner, the first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Based on the sixth aspect or the first implementation manner of the sixth aspect, in a second implementation manner, the sequence of the addresses in the second additional authentication data is the same as the sequence of the addresses in the first additional authentication data.

Based on the sixth aspect, or the first or second implementation manner of the sixth aspect, in a third implementation manner, the second packet further includes relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

Based on the sixth aspect, or the first, second, or third implementation manner of the sixth aspect, in a fourth implementation manner, the first node is a station, and the second node is an access point; or the first node is an access point, and the second node is a station.

According to a seventh aspect, the present invention provides a packet processing system, applied to a scenario in which a relay device forwards a packet between a first node and a second node, including the first node, the second node, and the relay device, where the first node includes the packet processing apparatus according to the fourth aspect, the second node includes the packet processing apparatus according to the fifth aspect, and the relay device includes the packet processing apparatus according to the sixth aspect.

In the present invention, a first node receives a first packet sent by a relay device, where the first packet includes data in a second packet sent by a second node to the relay device; the data in the second packet is encrypted by using second additional authentication data and a session key between the first node and the second node; the second additional authentication data is generated by the second node according to at least address information in a packet header of the second packet by using a second rule; the first node generates first additional authentication data according to at least address information in the first packet by using a first rule, where a sequence of addresses in the first additional authentication data generated by the first node according to the first rule is the same as a sequence of addresses in the second additional authentication data generated by the second node according to the second rule; the first node further decrypts data in the first packet by using the first additional authentication data and the session key between the first node and the second node. In this way, when receiving the second packet sent by the second node, the relay device does not need to send, after first performing decryption and then performing encryption on the second packet, the first packet to the first node, thereby saving a packet processing time of the relay device, improving channel utilization, and reducing additional power consumption of the relay device.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show some embodiments of the present invention, and persons of ordinary skill in the art may still derive other drawings from these accompanying drawings without creative efforts.

FIG. 3 is a schematic flowchart of a packet processing method according to an embodiment of the present invention;

FIG. 4 is a schematic architectural diagram of a packet processing system applied to an embodiment of the present invention.

FIG. 6 is a schematic flowchart of a packet processing method according to another embodiment of the present invention.

FIG. 7 is a schematic structural diagram of a packet processing apparatus according to an embodiment of the present invention.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention. All other embodiments obtained by persons of ordinary skill in the art based on the embodiments of the present invention without creative efforts shall fall within the protection scope of the present invention.

In the 802.11 standard, a STA refers to a device supporting the 802.11 protocol, and includes an AP. An AP is referred to as an AP STA in the standard, and a STA that is not an AP is referred to as a non-AP STA in the standard. A STA described in the present invention refers to an application terminal, that is, a non-AP STA; an AP described in the present invention may be an AP STA in the standard; a Relay described in the present invention may be a Relay STA in the standard.

Figures 1, 2:
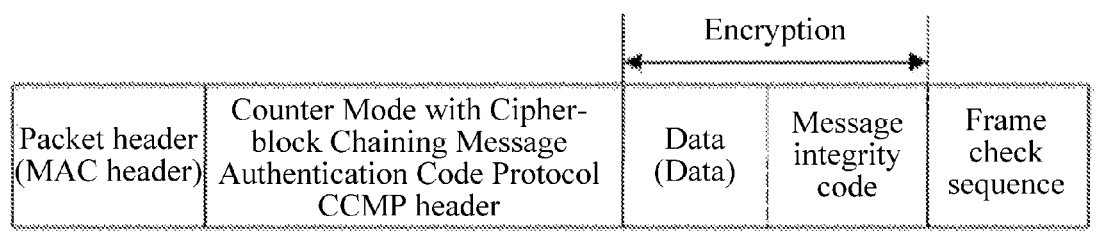
FIG. 1 is a schematic diagram of a frame format, of a packet encrypted by using a counter mode cipher block chaining message authentication code protocol (CCMP), applied to an embodiment of the present invention.
FIG. 2 is a schematic diagram of a format of a media access control (MAC) header applied to an embodiment of the present invention.

In the IEEE802.11ah standard, data in a packet is usually encrypted by using a Counter Mode with Cipher-block Chaining Message Authentication Code Protocol (CCMP). FIG. 1 is a schematic diagram of a frame format, of a packet encrypted by using the CCMP, applied to an embodiment of the present invention. A packet header is usually referred to as a Media Access Control (MAC) header. As shown in FIG. 1, a MAC header and a CCMP Header participate in an encryption calculation, but are not encrypted themselves; data and a message integrity code (MIC) that are in a to-be-sent packet are encrypted; a frame check sequence (FCS) is used to check whether an error occurs in a frame in a transmission process. A frame format, of a packet encrypted by using the CCMP, applicable to this embodiment of the present invention is not limited to the frame format shown in FIG. 1.

In an actual application, before encrypting, by using a CCMP algorithm, data and an MIC that are in a to-be-sent packet, an AP or a STA needs to generate additional authentication data (AAD) by using address information in a MAC header of the to-be-sent packet. FIG. 2 is a schematic diagram of a format of a MAC header applied to an embodiment of the present invention. As shown in FIG. 2, the MAC header includes multiple pieces of address information, where a sequence of addresses included in the address information is an address A1, an address A2, an address A3, and an address A4, where A1 is a receiving address, that is, an address of a node that currently receives a packet; A2 is a sending address, that is, an address of a node that currently sends a packet. When a destination address is the receiving address, the destination address does not need to be written in the MAC header; or when a destination address is not the receiving address, A3 is the destination address; the destination address is usually an address of a node that next receives a packet. When a source address is the sending address, the source address does not need to be written in the MAC header; or when a source address is not the sending address, the source address needs to be written in A3 or A4; the source address is usually an address of a node that previously sends a packet. The format, of a MAC header, applicable to this embodiment of the present invention is not limited to the format shown in FIG. 2.

It can be known from the structure of the MAC header shown in FIG. 2 that each time a packet is forwarded by a Relay, the sequence of the addresses in the MAC header is sure to change. Because the sequence of the addresses in the MAC header changes in a packet forwarding process, AAD generated according to the sequence of the addresses in the MAC header also changes; therefore, after receiving the packet, the Relay needs to decrypt encrypted data in the received packet, rewrite forwarded address information into the MAC header, then generate additional authentication data according to the rewritten address information, and encrypt the decrypted data by using the regenerated additional authentication data. In this way, a packet processing time of the Relay is increased, channel utilization is reduced, and additional power consumption of the Relay is increased.

In view of the foregoing existing problem, embodiments of the present invention provide a packet processing method, which is applied to a scenario in which a relay device forwards a packet between a first node and a second node, and can solve an existing problem that a processing process in which a relay device needs to perform decryption and then perform encryption when forwarding a packet between a station and an access point results in reduced channel utilization.

It should be noted that in the following embodiments, if the first node is an AP, the second node is a STA; or if the first node is a STA, the second node is an AP.

FIG. 3 is a schematic flowchart of a packet processing method according to an embodiment of the present invention, where the method is applied to a scenario in which a relay device forwards a packet between a first node and a second node. As shown in FIG. 3, the packet processing method includes:

301: A first node receives a first packet sent by a relay device, where the first packet includes data in a second packet sent by a second node to the relay device, the data in the second packet is encrypted by using second additional authentication data and a session key between the first node and the second node, the second additional authentication data is generated by the second node according to at least address information in a packet header of the second packet by using a second rule, and the address information in the packet header of the second packet indicates that a receiving party of the second packet is the relay device, a sending party is the second node, and a next receiving party is the first node.

In a specific implementation, FIG. 4 is a schematic architectural diagram of a packet processing system applied to an embodiment of the present invention. As shown in FIG. 4, assuming that an AP is a first node, and a STA is a second node, the STA generates a second packet, where a sequence of addresses in address information in a packet header (the MAC header shown in FIG. 2) of the second packet is that A1 is an address of a Relay, a sending address A2 also being a source address is an address of the STA, and an address A3 of a next receiving party is an address of the AP. The STA generates second AAD according to at least the address information in the packet header of the second packet by using a second rule, and the STA then encrypts data in the second packet by using the second AAD and a session key between the STA and the AP, and sends the encrypted second packet to the Relay.

After receiving the second packet sent by the STA, the Relay may perform reassembly to obtain a first packet, which may be that address information in a packet header (MAC header) of the first packet is filled, that is, a receiving address A1 also being a destination address is the address of the AP, a sending address A2 is the address of the Relay, and a source address A3 is the address of the STA; the encrypted data in the second packet is filled into a Data part in the first packet. The first packet may also be obtained after simply updating the address information in the second packet. In this embodiment, the Relay may directly fill the encrypted data in the second packet into the Data part in the first packet without performing decryption processing on the second packet sent by the STA, and the Relay then sends the first packet to the AP.

Optionally, the second packet sent by the STA to the Relay may further include relay message authentication information, where the relay message authentication information may be generated by the STA by using a message authentication key between the STA and the Relay; after receiving the second packet, the Relay verifies the relay message authentication information by using the message authentication key and sends the first packet to the AP if the verification succeeds.

302: The first node generates first additional authentication data according to at least address information in a packet header of the first packet by using a first rule, where the address information included in the packet header of the first packet indicates that a receiving party of the first packet is the first node, a sending party is the relay device, and a previous sending party is the second node, and the first additional authentication data is the same as the second additional authentication data.

It should be noted that this embodiment of the present invention is applied to a scenario in which a relay device forwards a packet between a first node and a second node; therefore, after receiving the first packet, the AP needs to determine, according to the address information in the packet header of the first packet, whether the first packet is forwarded by the Relay. Assuming that the sending address A2 is the address of the Relay, it can be determined that the first packet is forwarded by the Relay; or after the AP receives the first packet, it is assumed that the packet header of the first packet carries a flag bit sent by the Relay, for example, when the flag bit is 1, it indicates that the first packet is sent by the Relay, and when the flag bit is 0, it indicates that the first packet is not sent by the Relay. In a specific implementation, the flag bit sent by the Relay may be identified by using a bit reserved in frame control (FC) of the MAC header.

Because each time a packet is forwarded by the Relay, a sequence of addresses in a packet header is sure to change, the sequence of the addresses in the first packet received by the AP and sent by the Relay is different from the sequence of the addresses in the second packet sent by the STA to the Relay. To implement that the Relay does not need to perform decryption processing on the encrypted data in the second packet sent by the STA, and the AP can decrypt the encrypted data that is included in the first packet sent by the Relay and is in the second packet from the STA, the first additional authentication data generated by the AP according to each piece of address information in the packet header of the first packet by using the first rule needs to be the same as the second additional authentication data generated by the STA according to each piece of address information in the packet header of the second packet by using the second rule.

In a specific implementation, if the first rule is that a sequence of addresses in the first additional authentication data is the same as the sequence of the addresses in the packet header of the first packet, the second rule is that a sequence of addresses in the second additional authentication data is different from the sequence of the addresses in the packet header of the second packet, so that the sequence of the addresses in the second additional authentication data generated according to the second rule is the same as the sequence of the addresses in the first additional authentication data generated according to the first rule. Or if the first rule is that a sequence of addresses in the first additional authentication data is different from the sequence of the addresses in the packet header of the first packet, the second rule is that a sequence of addresses in the second additional authentication data is the same as the sequence of the addresses in the packet header of the second packet, so that the sequence of the addresses in the second additional authentication data generated according to the second rule is the same as the sequence of the addresses in the first additional authentication data generated according to the first rule.

As shown in FIG. 4, assuming that the second node, namely, the STA, generates the second additional authentication data according to the address information in the packet header of the second packet by using the second rule, where the second rule is that the sequence of the addresses in the second additional authentication data is the same as the sequence of the addresses in the packet header of the second packet, the first node, namely, the AP, generates the first additional authentication data according to the address information in the packet header of the first packet by using the first rule, where the first rule is that the sequence of the addresses in the first additional authentication data is different from the sequence of the addresses in the packet header of the first packet, so that the sequence of the addresses in the second additional authentication data generated by the second node, namely, the STA, according to the address information in the packet header of the second packet by using the second rule is the same as the sequence of the addresses in the first additional authentication data generated by the first node, namely, the AP, according to the address information in the packet header of the first packet by using the first rule.

In a specific implementation, for example, an address mapping table may be preset in the first node, namely, the AP, where a mapping relationship, of each address in the packet header of the first packet sent by the Relay, in a location of each address field in the AAD generated by the AP is set in the address mapping table.

Table 1 is a preset address mapping table in this embodiment of the present invention. As shown in FIG. 1, downlink represents that the AP sends a packet to the STA by using the Relay, and uplink represents that the STA sends a packet to the AP by using the Relay. To implement that the AP correctly decrypts the encrypted data that is included in the first packet sent by the Relay and is in the second packet from the STA, the sequence of the addresses in the AAD generated by the AP needs to be consistent with the sequence of the addresses in the AAD generated by the STA.

TABLE 1

| Direction | First address field in AAD of AP | Second address field in AAD of AP | Third address field in AAD of AP | Fourth address field in AAD of AP |
|---|---|---|---|---|
| Downlink | A3 in packet sent by AP to Relay | A1 in packet sent by AP to Relay | A2 in packet sent by AP to Relay | |
| Uplink | A2 in packet sent by Relay to AP | A3 in packet sent by Relay to AP | A1 in packet sent by Relay to AP | |

It should be noted that optionally, the AAD of the AP may have a fourth address field, and content that exists when the fourth address field exists is not specifically shown in Table 1. Based on the foregoing fact that the first node, namely, the AP, has determined that the first packet is sent by the Relay, the AP acquires the address information in the packet header of the first packet, where the address information is that the receiving address A1 also being the destination address is the address of the AP, the sending address A2 is the address of the Relay, and the source address A3 is the address of the STA; and queries the address mapping table shown in Table 1 to obtain a sequence of mapped addresses that corresponds to the acquired sequence of the addresses in the packet header of the first packet, that is, the receiving address A1 (the address of the AP) in the packet header of the first packet corresponds to A3 in the mapped addresses, the sending address A2 (the address of the Relay) in the packet header of the first packet corresponds to A1 in the mapped addresses, and the source address A3 (the address of the STA) in the packet header of the first packet corresponds to A2 in the mapped addresses.

Then, the generating, by the AP, the corresponding additional authentication data according to the address information in the packet header of the first packet by using the first rule may be filling, by the AP according to the sequence of the mapped addresses that corresponds to the sequence of the addresses in the packet header of the first packet, the mapped addresses separately into corresponding locations of A1, A2, and A3 in a MAC header of the generated additional authentication data, that is, filling the address of the Relay into the location of A1, filling the address of the STA into the location of A2, and filling the address of the AP into the location of A3, so as to generate the first additional authentication data, where the sequence of the addresses in the first additional authentication data is the address of the Relay, the address of the STA, and the address of the AP. In this case, the first node, namely, the AP, generates the corresponding first additional authentication data according to the address information in the header of the first packet by using the first rule, where the first rule is that the sequence of the addresses in the first additional authentication data is different from the sequence of the addresses in the header of the first packet, and then the second rule is that the sequence of the addresses in the second additional authentication data is the same as the sequence of the addresses in the header of the second packet. Because the sequence of the addresses in the address information in the header of the second packet is that A1 is the address of the Relay, the sending address A2 also being the source address is the address of the STA, and the address A3 of the next receiving node is the address of the AP, the sequence of the addresses in the corresponding second additional authentication data generated by the second node, namely, the STA, according to the address information in the header of the second packet by using the second rule is the address of the Relay, the address of the STA, and the address of the AP. In this way, the sequence of the addresses in the first AAD generated by the AP is the same as the sequence of the addresses in the second AAD generated by the STA; therefore, the AP can correctly decrypt the encrypted data that is included in the first packet sent by the Relay and is in the second packet from the STA.

It should be noted that as shown in FIG. 4, assuming that the second node, namely, the STA, generates the second additional authentication data according to the address information in the packet header of the second packet by using the second rule, where the second rule is that the sequence of the addresses in the second additional authentication data is different from the sequence of the addresses in the packet header of the second packet, the first node, namely, the AP, generates the first additional authentication data according to the address information in the packet header of the first packet by using the first rule, where the first rule is that the sequence of the addresses in the first additional authentication data is the same as the sequence of the addresses in the packet header of the first packet, so that the sequence of the addresses in the second additional authentication data generated by the second node, namely, the STA, according to the address information in the packet header of the second packet by using the second rule is the same as the sequence of the addresses in the first additional authentication data generated by the first node, namely, the AP, according to the address information in the packet header of the first packet by using the first rule. In a specific implementation, for example, an address mapping table may be preset in the second node, namely, the STA, where a mapping relationship, of each address in the packet header of the first packet sent by the Relay, in a location of each address field in the AAD generated by the second node, namely, the STA, may be set in the address mapping table, and a mapping principle is not described again.

303: The first node decrypts data in the first packet by using the first additional authentication data generated according to the first rule, and the session key between the first node and the second node.

In a specific implementation, the first node may perform a series of operations according to a CCMP algorithm by using the first additional authentication data, packet sequence number information in a CCMP header in the first packet, the session key between the first node and the second node, and the like to generate a first key value of a key chain, then perform a calculation on the first key value with a fixed formula to generate a second key value, and then perform a calculation on the second key value with the fixed formula to generate a third key value, and the rest may be deduced by analogy, where the series of key values are called the key chain. Each key value in the key chain may have 128 bits, and an exclusive OR operation is sequentially performed on each key value and 128 bits in to-be-decrypted data to obtain corresponding plaintext data. Persons skilled in the art may understand that the CCMP algorithm may be an existing technology, which is not limited in the present invention.

It should be additionally noted that additional authentication data may only include address information, and may also use other information except address information in a packet header, for example, a frame control (FC) field, a quality of service control (QoS control) field, and a sequence control (SC) field. These fields include many indication information bits; some of these information bits maintain, in the additional authentication data, same values as that in the packet header, and some are set to fixed values in the additional authentication data. To ensure that the first node and the second node generate same additional authentication data for same data transmitted between the first node and the second node, information bits that change after the Relay performs forwarding may be set to fixed values in generated additional authentication data. For example, the FC field has two information bits being to DS and from DS, which respectively represent whether the packet is sent to a network side or comes from a network side; when the Relay receives a packet sent by the STA, values of the two information bits may be "10", and when the Relay sends the packet to the AP, the values of the two information bits may be "11"; therefore, when generating additional authentication data, either of the STA and the AP sets the two information bits in the additional authentication data to a fixed value, for example, "11". The setting the information bits in the additional authentication data to the fix value does not represent a specific meaning, and only intends to enable the STA and the AP to obtain same additional authentication data.

Further, it should be additionally noted that a nonce may further be generated in the CCMP algorithm according to an address A2 in a packet header, and the nonce participates in an encryption calculation process; therefore, before correctly performing decryption, the first node needs to generate a same nonce after receiving the first packet. As shown in FIG. 4, A2 in the first packet sent by the Relay to the AP is different from A2 in the second packet received by the Relay from the STA. To enable the AP and the STA to use a same nonce, for example, in an uplink case, the AP needs to determine, according to the address mapping relationship shown in Table 1, that the address A3 in the packet header of the first packet sent by the Relay to the AP is the same as A2 in the second packet sent by the STA to the Relay; therefore, the AP may generate a nonce according to the address A3 in the header of the first packet. In this way, the nonce generated by the AP is the same as a nonce generated by the STA.

In this embodiment of the present invention, a first node receives a first packet sent by a relay device, where the first packet includes data in a second packet sent by a second node to the relay device; the data in the second packet is encrypted by using second additional authentication data and a session key between the first node and the second node; the second additional authentication data is generated by the second node according to at least address information in a packet header of the second packet by using a second rule; the first node generates first additional authentication data according to at least address information in the first packet by using a first rule, where a sequence of addresses in the first additional authentication data generated by the first node according to the first rule is the same as a sequence of addresses in the second additional authentication data generated by the second node according to the second rule; the first node further decrypts the data in the first packet by using the first additional authentication data and the session key between the first node and the second node. In this way, when receiving the second packet sent by the second node, the relay device does not need to send, after first performing decryption and then performing encryption on the second packet, the first packet to the first node, thereby saving a packet processing time of the relay device, improving channel utilization, and reducing additional power consumption of the relay device.

Figure 5:
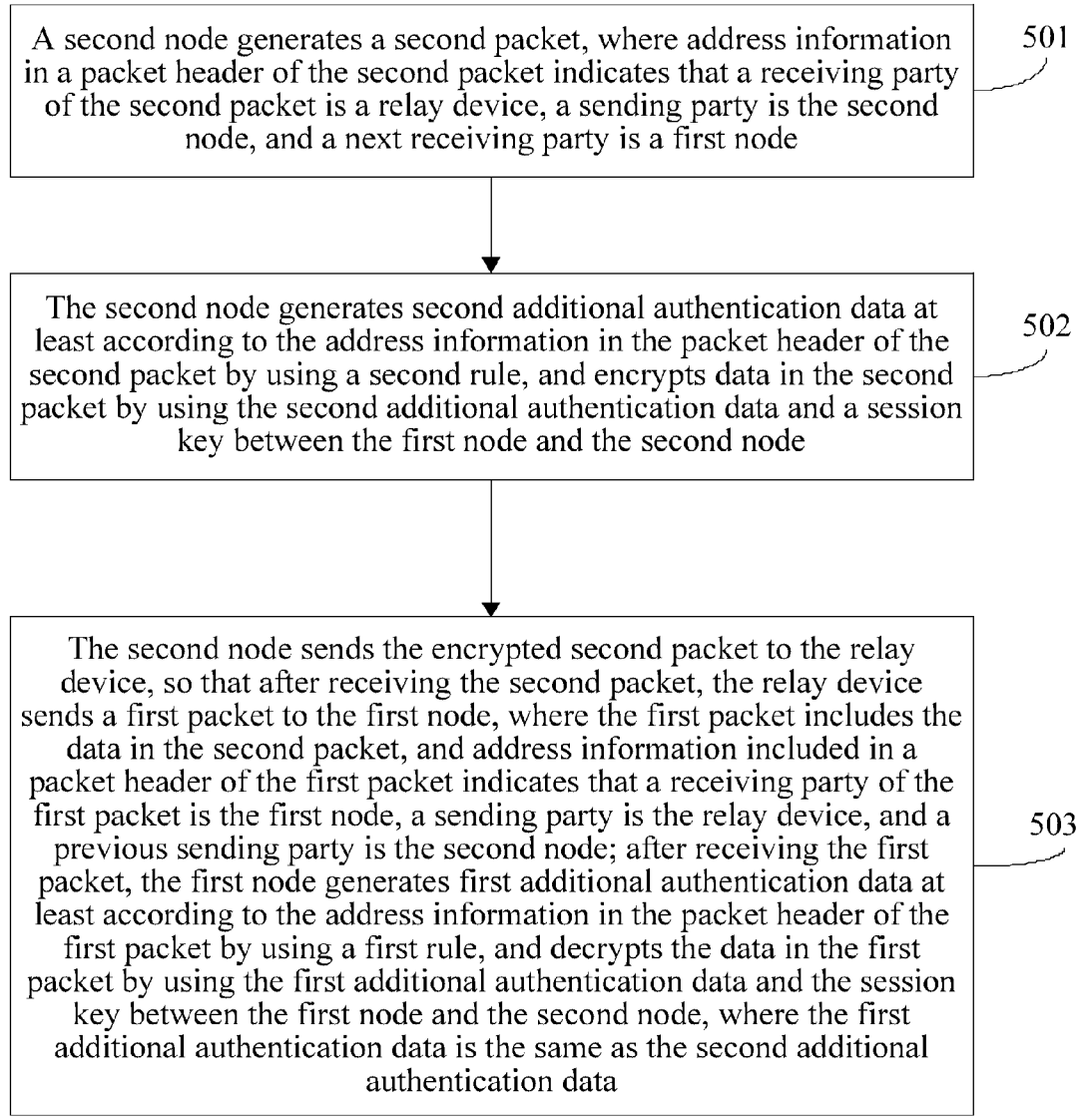
FIG. 5 is a schematic flowchart of a packet processing method according to another embodiment of the present invention.

FIG. 5 is a schematic flowchart of a packet processing method according to another embodiment of the present invention, where the method is applied to a scenario in which a relay device forwards a packet between a first node and a second node. As shown in FIG. 5, the packet processing method includes:

501: A second node generates a second packet, where address information in a packet header of the second packet indicates that a receiving party of the second packet is a relay device, a sending party is the second node, and a next receiving party is a first node.

In a specific implementation, as shown in FIG. 4, assuming that the second node is an AP and the first node is an STA, when the AP needs to send a piece of encrypted data to the STA, the AP may generate a second packet, and fill each piece of address information into a packet header of the second packet, where a receiving address A1 is an address of a Relay, a sending address A2 also being a source address is an address of the AP, and a destination address A3 is an address of the STA; and fill to-be-sent data into a Data part of the second packet.

502: The second node generates second additional authentication data according to at least the address information in the packet header of the second packet by using a second rule, and encrypts data in the second packet by using the second additional authentication data and a session key between the first node and the second node.

In a specific implementation, before the AP sends the second packet, the AP needs to generate the second additional authentication data; in this embodiment, the AP generates the second additional authentication data according to at least the address information in the second packet by using the second rule, where the second rule may be that a sequence of addresses in the second additional authentication data is the same as a sequence of addresses in the packet header of the second packet, or the second rule may also be that a sequence of addresses in the second additional authentication data is different from a sequence of addresses in the packet header of the second packet.

Then, the AP encrypts the data in the second packet by using the second additional authentication data and the session key between the first node and the second node. In a specific implementation, the AP may perform a series of operations according to a CCMP algorithm by using the second additional authentication data, packet sequence number information in a CCMP header in the second packet, the session key between the AP and the STA, and the like to generate a first key value of a key chain, then perform a calculation on the first key value with a fixed formula to generate a second key value, and then perform a calculation on the second key value with the fixed formula to generate a third key value, and the rest may be deduced by analogy, where the series of key values are the key chain. Each key value in the key chain may have 128 bits, and corresponding ciphertext data can be obtained by sequentially performing an exclusive OR operation on each key value and 128 bits in to-be-encrypted data.

503: The second node sends the encrypted second packet to the relay device, so that after receiving the second packet, the relay device sends a first packet to the first node, where the first packet includes the data in the second packet, and address information included in a packet header of the first packet indicates that a receiving party of the first packet is the first node, a sending party is the relay device, and a previous sending party is the second node; after receiving the first packet, the first node generates first additional authentication data according to at least the address information in the packet header of the first packet by using a first rule, and decrypts data in the first packet by using the first additional authentication data and the session key between the first node and the second node, where the first additional authentication data is the same as the second additional authentication data.

In this embodiment, as shown in FIG. 4, after receiving the second packet sent by the AP, the Relay does not need to decrypt the encrypted data in the second packet, and the Relay may perform reassembly to obtain the first packet, which may be specifically that: the encrypted data in the second packet is filled into a Data part in the first packet, and the address information in the packet header of the first packet is filled as follows: a receiving address A1 also being a destination address is the address of the STA, a sending address A2 is the address of the Relay, and a source address A3 is the address of the AP. The first packet may also be obtained after simply updating the address information in the second packet. Then, the Relay sends the first packet to the STA.

To enable the STA to correctly decrypt the encrypted data that is included in the first packet and is in the second packet from the AP, the first additional authentication data generated by the STA according to the address information in the first packet by using the first rule needs to be the same as the second additional authentication data generated by the AP according to the address information in the packet header of the second packet by using the second rule, which may include that a sequence of addresses in the first additional authentication data generated by the STA by using the first rule needs to be the same as the sequence of the addresses in the second additional authentication data generated by the AP by using the second rule, which may be as follows in a specific implementation:

If the second rule used by the AP is that the sequence of the addresses in the second additional authentication data is the same as the sequence of the addresses in the packet header of the second packet, the first rule used by the STA is that the sequence of the addresses in the first additional authentication data is different from a sequence of addresses in the packet header of the first packet, so that the sequence of the addresses in the first additional authentication data generated by the STA by using the first rule is the same as the sequence of the addresses in the second additional authentication data generated by the AP by using the second rule. Or if the second rule used by the AP is that the sequence of the addresses in the second additional authentication data is different from the sequence of the addresses in the packet header of the second packet, the first rule used by the STA is that the sequence of the addresses in the first additional authentication data is the same as a sequence of addresses in the packet header of the first packet, so that the sequence of the addresses in the first additional authentication data generated by the STA by using the first rule is the same as the sequence of the addresses in the second additional authentication data generated by the AP by using the second rule.

Further, in an optional implementation manner of the present invention, the second packet generated by the AP may further include relay message authentication information, where the relay message authentication information is generated by the AP by using a message authentication key between the Relay and the AP, so that after receiving the second packet sent by the AP, the Relay verifies the relay message authentication information by using the message authentication key and sends the first packet to the STA if the verification succeeds. The relay message authentication information may be obtained by the AP by performing an encryption operation or a hash operation on an FCS field of the second packet by using the message authentication key, which may be as follows in a specific implementation.

For example, as shown in FIG. 4, before sending the second packet to the Relay, the AP may negotiate a relay message authentication key with the Relay, where the relay message authentication key is used to perform simple message authentication on the second packet sent by the AP to the Relay. Usually, the AP may perform an encryption operation or a hash operation on the FCS field in the to-be-sent second packet by using the relay message authentication key negotiated between the AP and the Relay, and use an FCS field obtained after the encryption or hash operation as relay message authentication information to replace the original FCS field. In this embodiment, for ease of description, the FCS obtained after hash may be referred to as a relay authentication field R-Auth. After receiving the second packet sent by the AP, the Relay verifies the relay message authentication information by using the relay message authentication key, that is, the relay authentication field R-Auth carried in the second packet is verified. A specific verification method may be that: R-Auth' is generated by using a process that is the same as the process in which the AP generates R-Auth; R-Auth' and R-Auth in the packet are then compared, and if R-Auth' and R-Auth are equal, the verification succeeds; or otherwise, the verification fails. Based on the fact that the verification on R-Auth succeeds, the Relay assembles the encrypted data in the second packet into the first packet, and sends the first packet to the STA. Optionally, if the verification performed by the Relay on R-Auth fails, the Relay may directly discard the second packet.

In this embodiment of the present invention, a second node generates second additional authentication data according to address information in a second packet by using a second rule, encrypts data in the second packet by using the second additional authentication data and a session key between a first node and the second node, and then sends the second packet to a relay device, so that the relay device directly adds the encrypted data in the second packet to a first packet without decrypting the encrypted data in the second packet, and sends the first packet to the first node; therefore the first node generates first additional authentication data according to address information in the first packet by using a first rule, where the first additional authentication data generated by using the first rule is the same as the second additional authentication data generated by using the second rule; the first node decrypts the encrypted data in the first packet by using the first additional authentication data and the session key between the first node and the second node. In this way, the relay device can skip a process of performing decryption first and performing encryption next in a process of forwarding the encrypted packet, thereby saving a packet processing time, improving channel utilization, and reducing additional power consumption of the relay device.

FIG. 6 is a schematic flowchart of a packet processing method according to another embodiment of the present invention, where the method is applied to a scenario in which a relay device forwards a packet between a first node and a second node. As shown in FIG. 6, the packet processing method includes:

601: A relay device receives a second packet sent by a second node, where address information in a packet header of the second packet indicates that a receiving party of the second packet is the relay device, a sending party is the second node, and a next receiving party is a first node; data in the second packet is encrypted by using second additional authentication data and a session key between the first node and the second node; the second additional authentication data is generated by the second node according to at least the address information in the packet header of the second packet by using a second rule.

602: The relay device sends a first packet to the first node, where the first packet includes the data in the second packet, and address information included in a packet header of the first packet indicates that a receiving party of the first packet is the first node, a sending party is the relay device, and a previous sending party is the second node, so that the first node generates first additional authentication data according to at least the address information in the packet header of the first packet by using a first rule, and decrypts data in the first packet by using the first additional authentication data and the session key between the first node and the second node, where the first additional authentication data is the same as the second additional authentication data.

In this embodiment, after receiving the second packet sent by the second node, the relay device can directly fill the encrypted data into a Data part in the first packet without decrypting the encrypted data in the second packet, and fill the address information in the packet header of the first packet as follows: a receiving address A1 also being a destination address is an address of the first node, a sending address A2 is an address of the relay device, and a source address A3 is an address of the second node. Then, the relay device sends the first packet to the first node.

The first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Further, the sequence of the addresses in the second additional authentication data is the same as the sequence of the addresses in the first additional authentication data.

The first node is a station, and the second node is an access point; or the first node is an access point, and the second node is a station.

Further, in an implementation manner of the present invention, the second packet that is received by the relay device and sent by the second node may further include relay message authentication information, where the relay message authentication information is generated by the second node by using a message authentication key between the relay device and the second node, so that after receiving the second packet, the relay device verifies the relay message authentication information by using the message authentication key and sends the first packet to the first node if the verification succeeds. The relay message authentication information is generated by the second node by using a message authentication key between the relay device and the second node. In a specific implementation, the relay message authentication information may be obtained by the second node by performing an encryption operation or a hash operation on an FCS field of the second packet by using the message authentication key. For details, reference may be made to the description of the foregoing related part, which is not described herein again.

When the relay device in this embodiment of the present invention receives a second packet sent by a second node, the relay device can directly reassemble encrypted data in the second packet into a first packet without a process of first performing decryption and then performing encryption on the encrypted data, thereby saving a packet processing time of the relay device, improving channel utilization, and reducing additional power consumption of the relay device.

FIG. 7 is a schematic structural diagram of a packet processing apparatus according to an embodiment of the present invention, where the packet processing apparatus is located on a side of a first node and applied to a scenario in which a relay device forwards a packet between the first node and a second node. As shown in FIG. 7, the packet processing apparatus includes, a receiving module 71 configured to receive a first packet sent by the relay device, where the first packet includes data in a second packet sent by the second node to the relay device, the data in the second packet is encrypted by using second additional authentication data and a session key between the first node and the second node, the second additional authentication data is generated by the second node according to at least address information in a packet header of the second packet by using a second rule, and the address information in the packet header of the second packet indicates that a receiving party of the second packet is the relay device, a sending party is the second node, and a next receiving party is the first node, and a decryption module 72 configured to generate first additional authentication data according to at least address information in a packet header of the first packet by using a first rule, where the address information included in the packet header of the first packet indicates that a receiving party of the first packet is the first node, a sending party is the relay device, and a previous sending party is the second node, and the additional authentication data generated by using the first rule is the same as the additional authentication data generated by using the second rule; and decrypt data in the first packet by using the first additional authentication data and the session key between the first node and the second node, where the first additional authentication data is the same as the second additional authentication data.

The first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Further, the sequence of the addresses in the second additional authentication data is the same as the sequence of the addresses in the first additional authentication data.

Further, optionally, the second packet may include relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

The first node is a station, and the second node is an access point; or the first node is an access point, and the second node is a station.

In this embodiment of the present invention, a first node receives a first packet sent by a relay device, where the first packet includes data in a second packet sent by a second node to the relay device; the data in the second packet is encrypted by using second additional authentication data and a session key between the first node and the second node; the second additional authentication data is generated by the second node according to at least address information in a packet header of the second packet by using a second rule; the first node generates first additional authentication data according to at least address information in the first packet by using a first rule, where a sequence of addresses in the first additional authentication data generated by the first node according to the first rule is the same as a sequence of addresses in the second additional authentication data generated by the second node according to the second rule; the first node further decrypts data in the first packet by using the first additional authentication data and the session key between the first node and the second node. In this way, when receiving the second packet sent by the second node, the relay device does not need to send, after first performing decryption and then performing encryption on the second packet, the first packet to the first node, thereby saving a packet processing time of the relay device, improving channel utilization, and reducing additional power consumption of the relay device.

Figure 8:
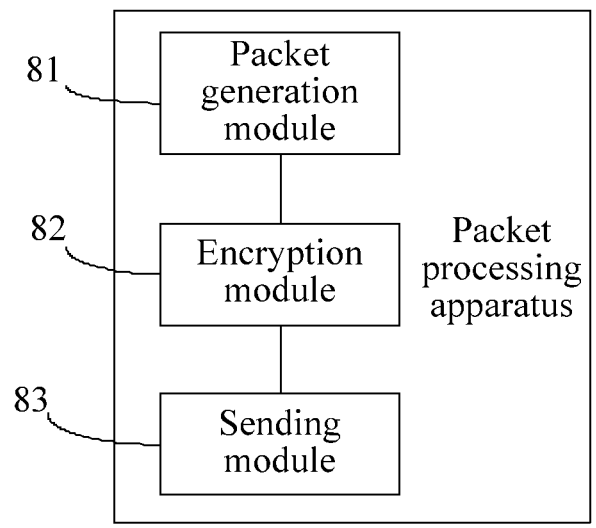
FIG. 8 is a schematic structural diagram of a packet processing apparatus according to another embodiment of the present invention.

FIG. 8 is a schematic structural diagram of a packet processing apparatus according to another embodiment of the present invention, where the packet processing apparatus is located on a side of a second node and applied to a scenario in which a relay device forwards a packet between the second node and a first node, and includes a packet generation module 81 configured to generate a second packet, where address information in a packet header of the second packet indicates that a receiving party of the second packet is the relay device, a sending party is the second node, and a next receiving party is the first node, an encryption module 82 configured to generate second additional authentication data according to at least the address information in the packet header of the second packet by using a second rule, and encrypt data in the second packet by using the second additional authentication data and a session key between the first node and the second node, and a sending module 83 configured to send the encrypted second packet to the relay device, so that after receiving the second packet, the relay device sends a first packet to the first node, where the first packet includes the data in the second packet, and address information included in a packet header of the first packet indicates that a receiving party of the first packet is the first node, a sending party is the relay device, and a previous sending party is the second node; after receiving the first packet, the first node generates first additional authentication data according to at least the address information in the packet header of the first packet by using a first rule, and decrypts data in the first packet by using the first additional authentication data and the session key between the first node and the second node, where the first additional authentication data is the same as the second additional authentication data.

The first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Further, the sequence of the addresses in the second additional authentication data is the same as the sequence of the addresses in the first additional authentication data.

Further, optionally, the second packet includes relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

The second node is a station, and the first node is an access point; or the second node is an access point, and the first node is a station.

In this embodiment of the present invention, a second node generates second additional authentication data according to address information in a second packet by using a second rule, encrypts data in the second packet by using the second additional authentication data and a session key between a first node and the second node, and then sends the second packet to a relay device, so that the relay device directly adds the encrypted data in the second packet to a first packet without decrypting the encrypted data in the second packet, and sends the first packet to the first node; therefore the first node generates first additional authentication data according to address information in the first packet by using a first rule, where the first additional authentication data generated by using the first rule is the same as the second additional authentication data generated by using the second rule; the first node decrypts the encrypted data in the first packet by using the first additional authentication data and the session key between the first node and the second node. In this way, the relay device can skip a process of performing decryption first and performing encryption next in a process of forwarding the encrypted packet, thereby saving a packet processing time, improving channel utilization, and reducing additional power consumption of the relay device.

Figure 9:
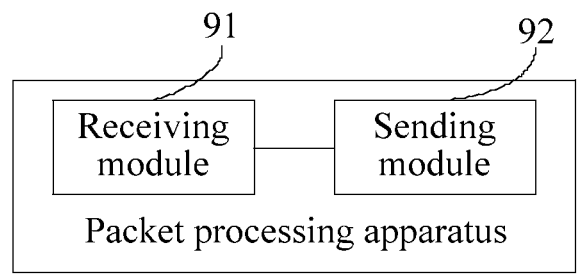
FIG. 9 is a schematic structural diagram of a packet processing apparatus according to another embodiment of the present invention.

FIG. 9 is a schematic structural diagram of a packet processing apparatus according to another embodiment of the present invention, where the packet processing apparatus is located on a side of a relay device and applied to a scenario in which the relay device forwards a packet between a second node and a first node, and includes a receiving module 91 configured to receive a second packet sent by the second node, where address information in a packet header of the second packet indicates that a receiving party of the second packet is the relay device, a sending party is the second node, and a next receiving party is the first node; data in the second packet is encrypted by using second additional authentication data and a session key between the first node and the second node; the second additional authentication data is generated by the second node according to at least the address information in the packet header of the second packet by using a second rule, and a sending module 92 configured to send a first packet to the first node, where the first packet includes the data in the second packet, and address information included in a packet header of the first packet indicates that a receiving party of the first packet is the first node, a sending party is the relay device, and a previous sending party is the second node, so that the first node generates first additional authentication data according to at least the address information in the packet header of the first packet by using a first rule, and decrypts data in the first packet by using the first additional authentication data and the session key between the first node and the second node, where the first additional authentication data is the same as the second additional authentication data.

The first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Further, the sequence of the addresses in the second additional authentication data is the same as the sequence of the addresses in the first additional authentication data.

Further, optionally, the second packet may include relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

The first node is a station, and the second node is an access point; or the first node is an access point, and the second node is a station.

When the relay device in this embodiment of the present invention receives a second packet sent by a second node, the relay device can directly reassemble encrypted data in the second packet into a first packet without a process of first performing decryption and then performing encryption on the encrypted data, thereby saving a packet processing time of the relay device, improving channel utilization, and reducing additional power consumption of the relay device.

Figure 10:
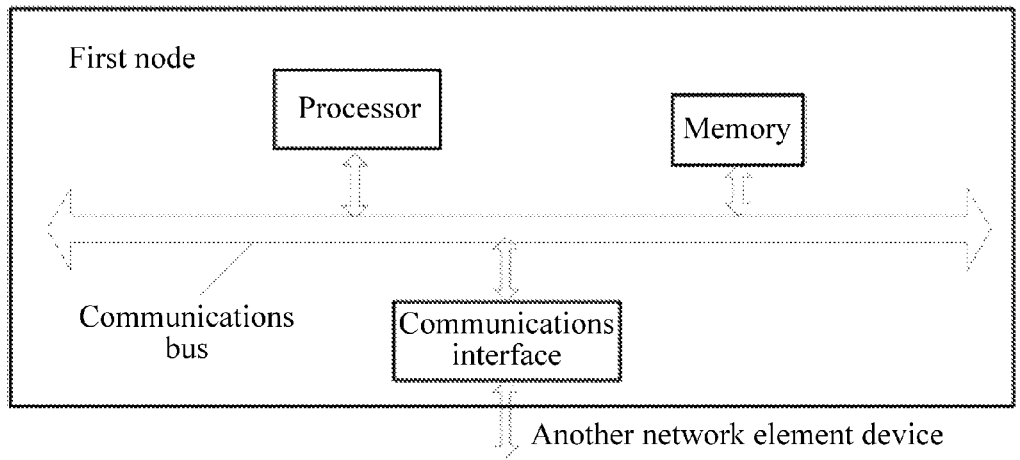
FIG. 10 is a schematic structural diagram of a packet processing apparatus according to another embodiment of the present invention.

FIG. 10 is a schematic structural diagram of a packet processing apparatus according to another embodiment of the present invention, where the packet processing apparatus is located on a side of a first node and applied to a scenario in which a relay device forwards a packet between the first node and a second node. The packet processing apparatus in this embodiment may be specifically an access point or a station. As shown in FIG. 10, the first node includes a processor, a memory, and a communications bus, where the processor is connected to the memory by using the communications bus, and the memory saves an instruction for implementing a packet processing method applied to the scenario in which the relay device forwards a packet between the first node and the second node. Further, the first node includes a communications interface, and communicates with another network element device (for example, a relay device) by using the communications interface.

When the processor invokes the instruction in the memory, the following steps may be performed receiving a first packet sent by the relay device, where the first packet includes data in a second packet sent by the second node to the relay device, the data in the second packet is encrypted by using second additional authentication data and a session key between the first node and the second node, the second additional authentication data is generated by the second node according to at least address information in a packet header of the second packet by using a second rule, and the address information in the packet header of the second packet indicates that a receiving party of the second packet is the relay device, a sending party is the second node, and a next receiving party is the first node, and generating first additional authentication data according to at least address information in a packet header of the first packet by using a first rule, where the address information included in the packet header of the first packet indicates that a receiving party of the first packet is the first node, a sending party is the relay device, and a previous sending party is the second node, and the additional authentication data generated by using the first rule is the same as the additional authentication data generated by using the second rule; and decrypting the data in the first packet by using the first additional authentication data and the session key between the first node and the second node, where the first additional authentication data is the same as the second additional authentication data.

The first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Further, the sequence of the addresses in the second additional authentication data is the same as the sequence of the addresses in the first additional authentication data.

Further, optionally, the second packet may include relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

The first node is a station, and the second node is an access point; or the first node is an access point, and the second node is a station.

In this embodiment of the present invention, a first node receives a first packet sent by a relay device, where the first packet includes data in a second packet sent by a second node to the relay device; the data in the second packet is encrypted by using second additional authentication data and a session key between the first node and the second node; the second additional authentication data is generated by the second node according to at least address information in a packet header of the second packet by using a second rule; the first node generates first additional authentication data according to at least address information in the first packet by using a first rule, where a sequence of addresses in the first additional authentication data generated by the first node according to the first rule is the same as a sequence of addresses in the second additional authentication data generated by the second node according to the second rule; the first node further decrypts data in the first packet by using the first additional authentication data and the session key between the first node and the second node. In this way, when receiving the second packet sent by the second node, the relay device does not need to send, after first performing decryption and then performing encryption on the second packet, the first packet to the first node, thereby saving a packet processing time of the relay device, improving channel utilization, and reducing additional power consumption of the relay device.

Figure 11:
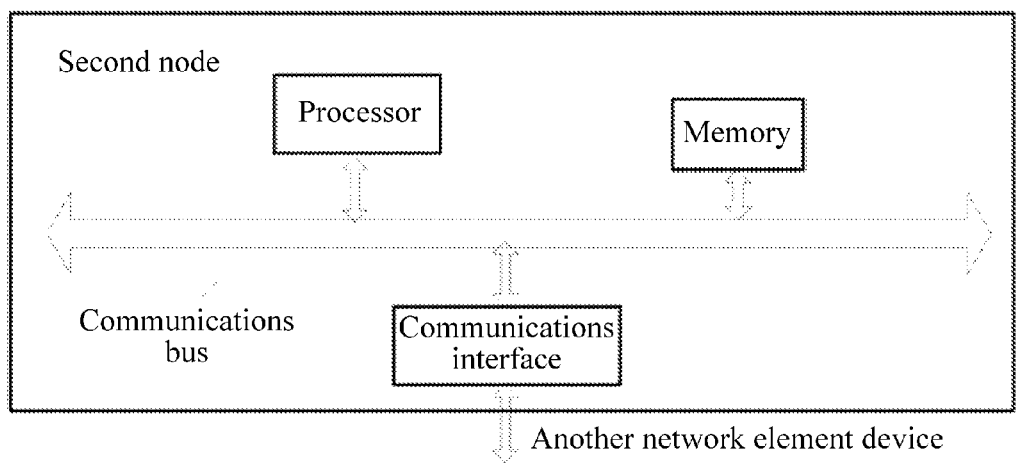
FIG. 11 is a schematic structural diagram of a packet processing apparatus according to another embodiment of the present invention.

FIG. 11 is a schematic structural diagram of a packet processing apparatus according to another embodiment of the present invention, where the packet processing apparatus is located on a side of a second node and applied to a scenario in which a relay device forwards a packet between a first node and the second node, and may be an AP or a STA. As shown in FIG. 11, the second node includes a processor, a memory, and a communications bus, where the processor is connected to the memory by using the communications bus, and the memory saves an instruction for implementing a packet processing method applied to the scenario in which the relay device forwards a packet between the first node and the second node. Further, the second node includes a communications interface, and communicates with another network element device (for example, a relay device) by using the communications interface.

When the processor invokes the instruction in the memory, the following steps may be performed generating a second packet, where address information in a packet header of the second packet indicates that a receiving party of the second packet is the relay device, a sending party is the second node, and a next receiving party is the first node, generating second additional authentication data according to at least the address information in the packet header of the second packet by using a second rule, and encrypting data in the second packet by using the second additional authentication data and a session key between the first node and the second node, and sending the encrypted second packet to the relay device, so that after receiving the second packet, the relay device sends a first packet to the first node, where the first packet includes the data in the second packet, and address information included in a packet header of the first packet indicates that a receiving party of the first packet is the first node, a sending party is the relay device, and a previous sending party is the second node; after receiving the first packet, the first node generates first additional authentication data according to at least the address information in the packet header of the first packet by using a first rule, and decrypts data in the first packet by using the first additional authentication data and the session key between the first node and the second node, where the first additional authentication data is the same as the second additional authentication data.

The first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Further, the sequence of the addresses in the second additional authentication data is the same as the sequence of the addresses in the first additional authentication data.

Further, optionally, the second packet may include relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

The second node is a station, and the first node is an access point; or the second node is an access point, and the first node is a station.

In this embodiment of the present invention, a second node generates second additional authentication data according to address information in a second packet by using a second rule, encrypts data in the second packet by using the second additional authentication data and a session key between a first node and the second node, and then sends the second packet to a relay device, so that the relay device directly adds the encrypted data in the second packet to a first packet without decrypting the encrypted data in the second packet, and sends the first packet to the first node; therefore the first node generates first additional authentication data according to address information in the first packet by using a first rule, where the first additional authentication data generated by using the first rule is the same as the second additional authentication data generated by using the second rule; the first node decrypts the encrypted data in the first packet by using the first additional authentication data and the session key between the first node and the second node. In this way, the relay device can skip a process of performing decryption first and performing encryption next in a process of forwarding the encrypted packet, thereby saving a packet processing time, improving channel utilization, and reducing additional power consumption of the relay device.

Figure 12:
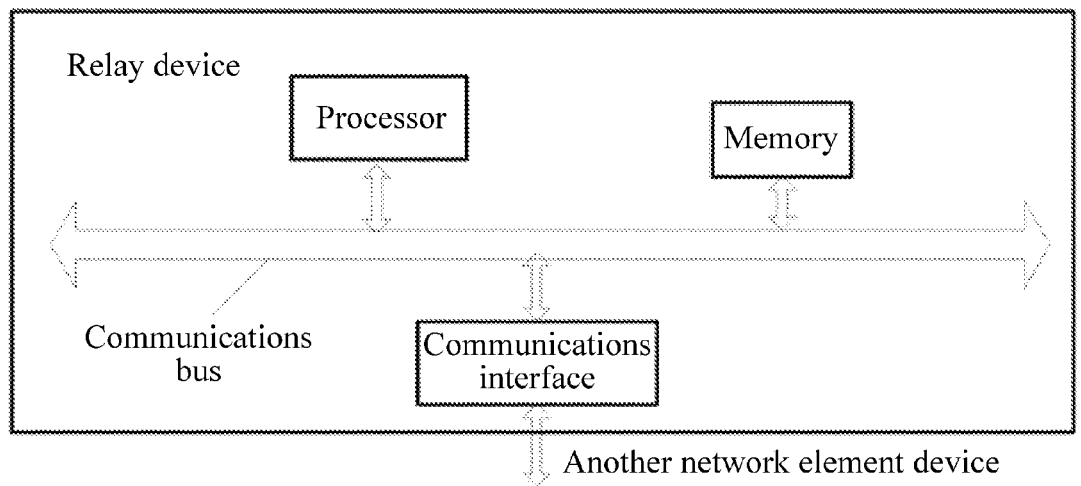
FIG. 12 is a schematic structural diagram of a packet processing apparatus according to another embodiment of the present invention.

FIG. 12 is a schematic structural diagram of a packet processing apparatus according to another embodiment of the present invention, where the packet processing apparatus is located on a side of a relay device and applied to a scenario in which the relay device forwards a packet between a first node and a second node, and may be a Relay. As shown in FIG. 12, the relay device includes a processor, a memory, and a communications bus, where the processor is connected to the memory by using the communications bus, and the memory saves an instruction for implementing a packet processing method applied to the scenario in which the relay device forwards a packet between the first node and the second node. Further, the relay device includes a communications interface, and communicates with another network element device (for example, an access point or a station) by using the communications interface.

When the processor invokes the instruction in the memory, the following steps may be performed receiving a second packet sent by the second node, where address information in a packet header of the second packet indicates that a receiving party of the second packet is the relay device, a sending party is the second node, and a next receiving party is the first node; data in the second packet is encrypted by using second additional authentication data and a session key between the first node and the second node; the second additional authentication data is generated by the second node according to at least the address information in the packet header of the second packet by using a second rule, and sending a first packet to the first node, where the first packet includes the data in the second packet, and address information included in a packet header of the first packet indicates that a receiving party of the first packet is the first node, a sending party is the relay device, and a previous sending party is the second node, so that the first node generates first additional authentication data according to at least the address information in the packet header of the first packet by using a first rule, and decrypts data in the first packet by using the first additional authentication data and the session key between the first node and the second node, where the first additional authentication data is the same as the second additional authentication data.

The first rule is that a sequence of addresses in the first additional authentication data is the same as a sequence of addresses in the packet header of the first packet, and the second rule is that a sequence of addresses in the second additional authentication data is different from a sequence of addresses in the packet header of the second packet, so that the sequence of the addresses in the second additional authentication data is the same as the sequence of the addresses in the first additional authentication data, or the first rule is that a sequence of addresses in the first additional authentication data is different from a sequence of addresses in the packet header of the first packet, and the second rule is that a sequence of addresses in the second additional authentication data is the same as a sequence of addresses in the packet header of the second packet, so that the sequence of the addresses in the second additional authentication data is the same as the sequence of the addresses in the first additional authentication data.

Further, the sequence of the addresses in the second additional authentication data is the same as the sequence of the addresses in the first additional authentication data.

Further, optionally, the second packet may include relay message authentication information, where the relay message authentication information is generated by the second node by using a message authentication key between the relay device and the second node; after receiving the second packet, the relay device verifies the relay message authentication information by using the message authentication key and sends the first packet to the first node if the verification succeeds.

The first node is a station, and the second node is an access point; or the first node is an access point, and the second node is a station.

When the relay device in this embodiment of the present invention receives a second packet sent by a second node, the relay device can directly reassemble encrypted data in the second packet into a first packet without a process of first performing decryption and then performing encryption on the encrypted data, thereby saving a packet processing time of the relay device, improving channel utilization, and reducing additional power consumption of the relay device.

Figure 13:
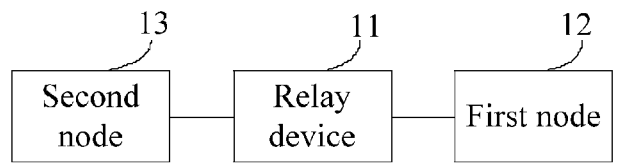
FIG. 13 is a schematic structural diagram of a packet processing system according to an embodiment of the present invention.

FIG. 13 is a schematic structural diagram of a packet processing system according to another embodiment of the present invention, where the packet processing system is applied to a scenario in which a relay device forwards a packet between a first node and a second node. As shown in FIG. 13, the system includes a relay device 11, a first node 12, and a second node 13.

The first node 12 includes the packet processing apparatus provided in the embodiment shown in FIG. 7 or FIG. 10, and for detailed content, refer to the related description of the packet processing apparatus provided in the embodiment shown in FIG. 7 or FIG. 10.

The second node 13 includes the packet processing apparatus provided in the embodiment shown in FIG. 8 or FIG. 11, and for detailed content, refer to the related description of the packet processing apparatus provided in the embodiment shown in FIG. 8 or FIG. 11.

The relay device 11 is the packet processing apparatus provided in the embodiment shown in FIG. 9 or FIG. 12, and for detailed content, refer to the related description of the packet processing apparatus provided in the embodiment shown in FIG. 9 or FIG. 12.

In an actual application, if the first node is an access point, the second node is a station; or if the first node is a station, the second node is an access point.

In this embodiment of the present invention, a first node receives a first packet sent by a relay device, where the first packet includes data in a second packet sent by a second node to the relay device; the data in the second packet is encrypted by using second additional authentication data and a session key between the first node and the second node; the second additional authentication data is generated by the second node according to at least address information in a packet header of the second packet by using a second rule; the first node generates first additional authentication data according to at least address information in the first packet by using a first rule, where a sequence of addresses in the first additional authentication data generated by the first node according to the first rule is the same as a sequence of addresses in the second additional authentication data generated by the second node according to the second rule;

the first node further decrypts data in the first packet by using the first additional authentication data and the session key between the first node and the second node. In this way, when receiving the second packet sent by the second node, the relay device does not need to send, after first performing decryption and then performing encryption on the second packet, the first packet to the first node, thereby saving a packet processing time of the relay device, improving channel utilization, and reducing additional power consumption of the relay device.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

What is claimed is:

1. A packet processing method of forwarding a packet between a first node and a second node, comprising:
receiving, by the first node, a first packet from a relay device, wherein the first packet comprises data in a second packet from the second node to the relay device, wherein the data in the second packet is encrypted using second additional authentication data and a session key between the first node and the second node, wherein the second additional authentication data is generated by the second node according to second address information in a second packet header of the second packet by using a second rule, wherein the second address information in the second packet header includes a second sequence of addresses, and wherein the second address information in the second packet header of the second packet indicates that a first receiving party of the second packet is the relay device, a sending party of the second packet is the second node, and a second receiving party of the second packet is the first node;

generating, by the first node, first additional authentication data according to first address information in a first packet header of the first packet using a first rule, wherein the first address information in the first packet header includes a first sequence of addresses that is different than the second sequence of addresses in the second address information, wherein the first address information that is part of the first packet header of the first packet indicates that a receiving party of the first packet is the first node, a first sending party of the first packet is the relay device, and a second sending party of the first packet is the second node, and wherein the first additional authentication data is the same as the second additional authentication data; and decrypting, by the first node, data in the first packet using the first additional authentication data and the session key between the first node and the second node.

2. The method of claim 1, wherein the first rule is that a third sequence of addresses in the first additional authentication data is the same as the first sequence of addresses in the first packet header of the first packet, wherein the second rule is that a fourth sequence of addresses in the second additional authentication data is different from the second sequence of addresses in the second packet header of the second packet, and wherein the fourth sequence of the addresses in the second additional authentication data is the same as the third sequence of the addresses in the first additional authentication data.

3. The method of claim 1, wherein the first rule is that a third sequence of addresses in the first additional authentication data is different from the fit sequence of addresses in the first packet header of the first packet, wherein the second rule is that a fourth sequence of addresses in the second additional authentication data is the same as the second sequence of addresses in the second packet header of the second packet, and wherein the fourth sequence of the addresses in the second additional authentication data is the same as the third sequence of the addresses in the first additional authentication data.

4. The method of claim 1, wherein a fourth sequence of addresses in the second additional authentication data is the same as a third sequence of addresses in the first additional authentication data.

5. The method of claim 1, wherein the second packet further comprises relay message authentication information, wherein the relay message authentication information is generated by the second node using a message authentication key between the relay device and the second node, and wherein after receiving the second packet, the relay device verifies the relay message authentication information using the message authentication key and sends the first packet to the first node when the verification succeeds.

6. A packet processing method of forwarding a packet between a first node and a second node, comprising:
generating, by the second node, a second packet, wherein second address information in a second packet header of the second packet indicates that a first receiving party of the second packet is a relay device, wherein a sending party of the second packet is the second node, wherein a second receiving party of the second packet is the first node, and wherein the second address information in the second packet header includes a second sequence of addresses;

generating, by the second node, second additional authentication data according to the second address information in the second packet header of the second packet using a second rule, and encrypting data in the second packet to form an encrypted second packet using the second additional authentication data and a session key between the first node and the second node; and sending, by the second node, the encrypted second packet to the relay device, wherein the first node receives a first packet from the relay device, wherein the first packet comprises the data in the second packet, wherein first address information that is part of a first packet header of the first packet indicates that a receiving party of the first packet is the first node, a first sending party of the first packet is the relay device, and a second sending party of the first packet is the second node, and wherein the first address information in the first packet header includes a first sequence of addresses that is different than the second sequence of addresses in the second packet header, wherein after receiving the first packet, the first node:
generates first additional authentication data according to the first address information in the first packet header of the first packet by using a first rule; and
decrypts data in the first packet by using the first additional authentication data and the session key between the first node and the second node, wherein the first additional authentication data is the same as the second additional authentication data.

7. The method of claim 6, wherein the first rule is that a third sequence of addresses in the first additional authentication data is the same as the first sequence of addresses in the first packet header of the first packet, wherein the second rule is that a fourth sequence of addresses in the second additional authentication data is different from the second sequence of addresses in the second packet header of the second packet, and wherein the fourth sequence of the addresses in the second additional authentication data is the same as the third sequence of the addresses in the first additional authentication data.

8. The method of claim 6, wherein the first rule is that a third sequence of addresses in the first additional authentication data is different from the first sequence of addresses in the first packet header of the first packet, wherein the second rule is that a fourth sequence of addresses in the second additional authentication data is the same as the second sequence of addresses in the second packet header of the second packet, and wherein the fourth sequence of the addresses in the second additional authentication data is the same as the third sequence of the addresses in the first additional authentication data.

9. The method of claim 6, wherein a fourth sequence of addresses in the second additional authentication data is the same as a third sequence of addresses in the first additional authentication data.

10. The method of claim 6, wherein the second packet further comprises relay message authentication information, wherein the relay message authentication information is generated by the second node using a message authentication key between the relay device and the second node, and wherein after receiving the second packet, the relay device verifies the relay message authentication information using the message authentication key and sends the first packet to the first node when the verification succeeds.

11. A packet processing apparatus, comprising:
a communications interface;
a memory coupled to the communications interface;
a processor coupled to the memory; and
a communications bus coupled to the processor, wherein the processor is configured to perform the following steps according to instructions saved in the memory:
receive a first packet from a relay device, wherein the first packet comprises data in a second packet from a second node to the relay device, wherein the data in the second packet is encrypted by using second additional authentication data and a session key between a first node and the second node, wherein the second additional authentication data is generated by the second node according to second address information in a second packet header of the second packet by using a second rule, wherein the second address information in the second packet header includes a second sequence of addresses, and wherein the second address information in the second packet header of the second packet indicates that a first receiving party of the second packet is the relay device, a sending party of the second packet is the second node, and a second receiving party of the second packet is the first node;
generate first additional authentication data according to first address information in a first packet header of the first packet by using a first rule, wherein the first address information in the first packet header includes a first sequence of addresses that is different than the second sequence of addresses in the second packet header, wherein the first address information that is part of the first packet header of the first packet indicates that a receiving party of the first packet is the first node, a first sending party of the first packet is the relay device, and a second sending party of the first packet is the second node, and wherein the first additional authentication data generated by using the first rule is the same as the second additional authentication data generated by using the second rule; and
decrypt data in the first packet using the first additional authentication data and the session key between the first node and the second node, wherein the first additional authentication data is the same as the second additional authentication data.

12. The apparatus of claim 11, wherein the first rule is that a third sequence of addresses in the first additional authentication data is the same as the first sequence of addresses in the fit packet header of the first packet, wherein the second rule is that a fourth sequence of addresses in the second additional authentication data is different from the second sequence of addresses in the second packet header of the second packet, and wherein the fourth sequence of the addresses in the second additional authentication data is the same as the third sequence of the addresses in the first additional authentication data.

13. The apparatus of claim 11, wherein the first rule is that a third sequence of addresses in the first additional authentication data is different from the first sequence of addresses in the first packet header of the first packet, wherein the second rule is that a fourth sequence of addresses in the second additional authentication data is the same as the second sequence of addresses in the second packet header of the second packet, and wherein the fourth sequence of the addresses in the second additional authentication data is the same as the third sequence of the addresses in the first additional authentication data.

14. The apparatus of claim 11, wherein a fourth sequence of addresses in the second additional authentication data is the same as a third sequence of addresses in the first additional authentication data.

15. The apparatus of claim 11, wherein the second packet further comprises relay message authentication information, wherein the relay message authentication information is generated by the second node using a message authentication key between the relay device and the second node, and wherein after receiving the second packet, the relay device verifies the relay message authentication information using the message authentication key and sends the first packet to the first node when the verification succeeds.

16. A packet processing apparatus, comprising:
a communications interface;
a memory;
a processor; and
a communications bus coupled to the communications interface, the memory, and the processor, wherein the processor is configured to perform the following steps according to instructions saved in the memory:
generate a second packet, wherein second address information in a second packet header of the second packet indicates that a first receiving party of the second packet is a relay device, a sending party of the second packet is a second node, and a second receiving party of the second packet is a first node, and wherein the second address information in the second packet header includes a second sequence of addresses;
generate second additional authentication data according to the second address information in the second packet header of the second packet using a second rule;
encrypt data in the second packet to form an encrypted second packet using the second additional authentication data and a session key between the first node and the second node; and
send the encrypted second packet to the relay device so that after receiving the second packet, the relay device sends a first packet to the first node, wherein the first packet comprises data in the second packet, wherein first address information that is part of a first packet header of the first packet indicates that a receiving party of the first packet is the first node, a first sending party of the first packet is the relay device, and a second sending party of the first packet is the second node, and wherein the first address information in the first packet header includes a first sequence of addresses that is different than the second sequence of addresses in the second packet header,
wherein after receiving the first packet, the first node generates first additional authentication data according to at least the first address information in the first packet header of the first packet by using a first rule, and decrypts data in the first packet by using the first additional authentication data and the session key between the first node and the second node, and
wherein the first additional authentication data is the same as the second additional authentication data.

17. The apparatus of claim 16, wherein the first rule is that a third sequence of addresses in the first additional authentication data is the same as the first sequence of addresses in the first packet header of the first packet, wherein the second rule is that a fourth sequence of addresses in the second additional authentication data is different from the second sequence of addresses in the second packet header of the second packet, and wherein the fourth sequence of the addresses in the second additional authentication data is the same as the third sequence of the addresses in the first additional authentication data.

18. The apparatus of claim 16, wherein the first rule is that a third sequence of addresses in the first additional authentication data is different from the first sequence of addresses in the first packet header of the first packet, wherein the second rule is that a fourth sequence of addresses in the second additional authentication data is the same as the second sequence of addresses in the second packet header of the second packet, and wherein the fourth sequence of the addresses in the second additional authentication data is the same as the third sequence of the addresses in the first additional authentication data.

19. The apparatus of claim 16, wherein a fourth sequence of addresses in the second additional authentication data is the same as a third sequence of addresses in the first additional authentication data.

20. The apparatus of claim 16, wherein the second packet further comprises relay message authentication information, wherein the relay message authentication information is generated by the second node using a message authentication key between the relay device and the second node, and wherein after receiving the second packet, the relay device verifies the relay message authentication information using the message authentication key and sends the first packet to the first node when the verification succeeds.

* * * * *

UNITED STATES PATENT AND TRADEMARK OFFICE
CERTIFICATE OF CORRECTION

PATENT NO.           : 9,872,175 B2
APPLICATION NO.      : 14/734812
DATED                : January 16, 2018
INVENTOR(S)          : Zhiming Ding and Guiming Shu It is certified that error appears in the above-identified patent and that said Letters Patent is hereby corrected as shown below:

In the Claims

Column 30; Line 42; Claim 3 should read:
authentication data is different from the first sequence of address in Column 32; Line 54; Claim 12 should read:
the first packet header of the first packet, wherein the second Signed and Sealed this
Thirteenth Day of March, 2018

Andrei Iancu
*Director of the United States Patent and Trademark Office*